Figure 1:
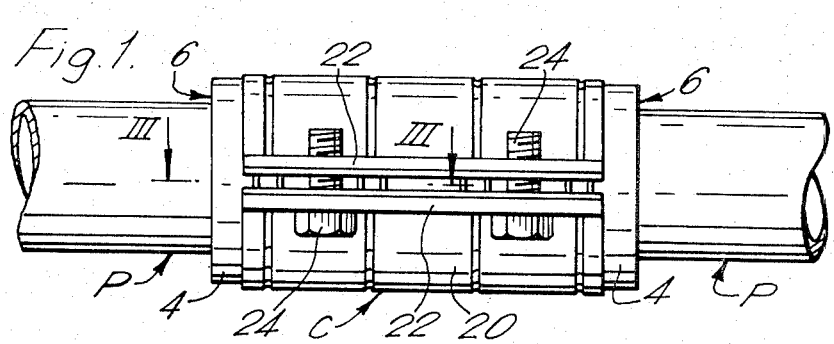

United States Patent [19]
Kimberley

[11] 3,790,194
[45] Feb. 5, 1974

[54] PIPE COUPLING

[75] Inventor: Stanley H. Kimberley, Shelburne, Ontario, Canada

[73] Assignee: Kelstan Plastic Products Limited, Weston, Ontario, Canada

[22] Filed: Aug. 2, 1972

[21] Appl. No.: 277,413

[52] U.S. Cl. .............................. 285/373, 285/382.7
[51] Int. Cl. ............................................. F16l 21/06
[58] Field of Search ... 285/236, 373, 235, 237, 343, 285/348, 369, 382, 322, 256, 372, 419, 418, 382.7

[56] References Cited
UNITED STATES PATENTS

| | | | |
|---|---|---|---|
| 2,417,741 | 3/1947 | Dillon | 285/373 |
| 2,449,795 | 9/1948 | Stillwagon | 285/373 X |
| 3,420,554 | 1/1969 | Straub | 285/369 X |
| 3,378,282 | 4/1968 | Demler | 285/256 X |
| 3,476,412 | 11/1969 | Demler | 285/322 |
| 3,118,692 | 1/1964 | Fitzhugh | 285/322 X |
| 3,423,111 | 1/1969 | Elsner | 285/373 X |
| 2,451,354 | 10/1948 | Ohls | 285/373 X |
| R22,156 | 8/1942 | Morris | 285/373 |
| 3,479,066 | 11/1969 | Gittleman | 285/236 |
| 2,613,086 | 10/1952 | Wolfram | 285/348 X |
| 3,432,189 | 3/1969 | Buller | 285/348 X |
| 3,233,922 | 2/1966 | Evans | 285/236 |

FOREIGN PATENTS OR APPLICATIONS

| | | | |
|---|---|---|---|
| 1,258,286 | 3/1961 | France | 285/369 |

Primary Examiner—Thomas F. Callaghan

[57] ABSTRACT

A coupling for rigid piping formed of incisable pipe materials including a rigid sleeve having open ends respectively providing mating for a pair of ends of piping to be coupled in flow-through relation; a clamp for releasably clamping said sleeve to constrict it about and to grip the piping ends mating therewith; means for effecting sealing between said sleeve and said piping ends when the sleeve is constricted as aforesaid, and anchor elements disposed to be sandwiched between the mating sleeve and piping ends; at least one of said anchor elements being sharpened enabling it to bite into a piping end when the sleeve is constricted as aforesaid whereby to interlock the sleeve and the piping.

4 Claims, 3 Drawing Figures

PATENTED FEB 5 1974 3,790,194

PIPE COUPLING

The invention relates to joints for piping and, particularly, to a coupling for joining a pair of ends of piping in flow-through relation in a fluid-tight and separation-resisting manner.

The innovative principles of the invention are applicable to couplings for joining piping ends which may or may not be threaded or may or may not be provided with spigots, bells, or other types of end formations or comparable expedients for facilitating interconnection. The invention is particularly adapted to, but not limited to, use with soil piping. Within the context of this submission the word "piping" is also meant to include pipe fittings such as elbows, tees and so forth.

An important object of the invention is to provide a coupling as aforesaid for interconnecting piping ends as described in a fluid-tight manner capable, also, of withstanding substantial tension forces in an axial direction without adverse effects.

Another object of the invention is to provide a coupling device or pipe joint for interconnecting the new ends of two or more pieces of piping which are neither threaded nor enlarged, nor otherwise formed or prepared for such interconnection.

The coupling of the present invention is particularly adapted for use with piping formed of plastic which is inherently rigid but, nevertheless, penetrable or incisable by sharp and pointed objects under pressure and, as visualized in the present embodiment, the piping should not be subject to "cold flow" or "creep".

The various objects of the invention are attained by means of a rigid sleeve having open ends respectively providing mating for a pair of ends of piping to be coupled together in flow-through relation as aforesaid. A clamp of conventional character is visualized for releasably clamping said sleeve to constrict it about the pipe ends which are mated with it; the sleeve being also formed of plastic of a type rendering it inherently rigid but nevertheless constrictable by the clamp to effect a tight, frictional and sealing grip on each said pipe end. Anchor elements are disposed to be sandwiched between the mating sleeve and pipe ends; these anchor elements having sharpened points or incisors enabling them to bite into the said ends when the sleeve is constricted as aforesaid so as to interlock the sleeve with the pipes rendering them strongly resistant to separation.

To provide a tight seal between each pipe end and the sleeve, the interior wall of the sleeve may be provided with a plurality of beads which are pressed against the pipe end when the sleeve is constricted as aforesaid and which tend to mushroom under pressure so as to flatten and conform sealingly to the pipe end which they embrace.

The sleeve may also have intermediate abutment means which acts as a stop, limiting the penetration of each pipe into the sleeve.

Figure 2:
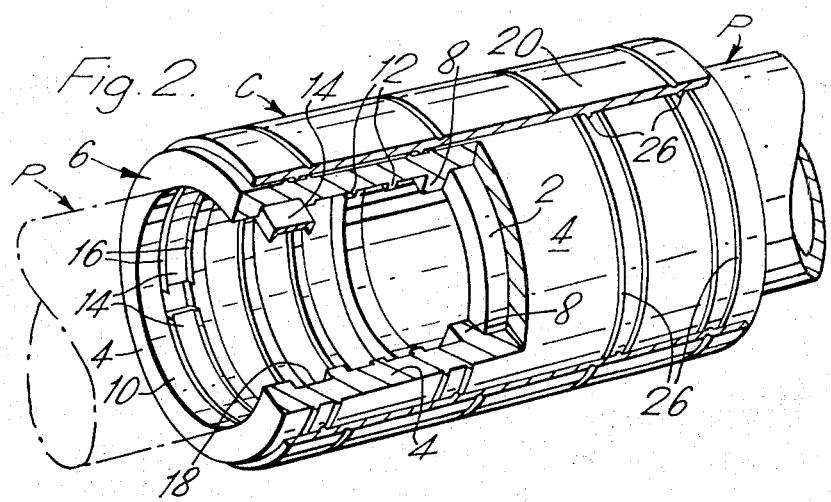
Figure 3:
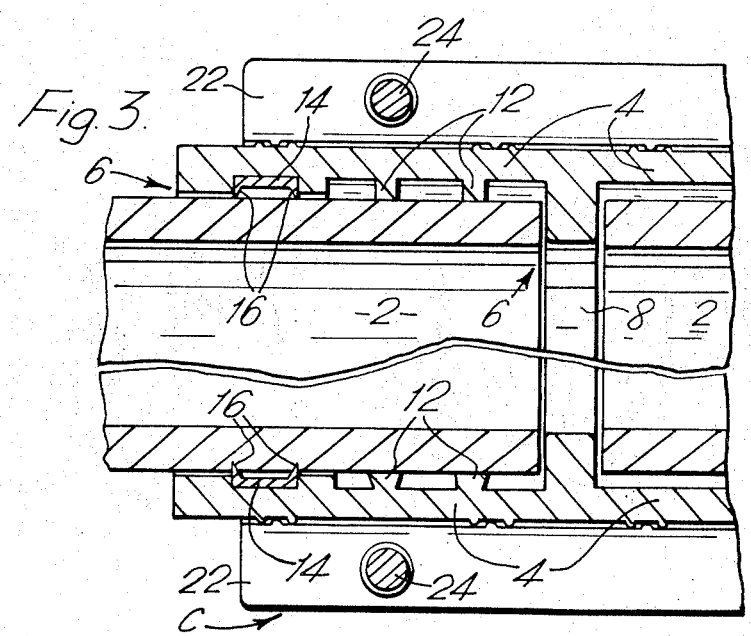

The foregoing and other more or less broad objects of the invention in part obvious and in part specifically defined will be apparent from the following description of the elements parts and principles of the invention as applied to one embodiment which has been selected and is illustrated in the accompanying drawing by way of example only and wherein like reference devices identify like parts throughout the several views and wherein:

FIG. 1 — is a view in elevation of pieces of a pair of pipes interconnected by a coupling according to the invention;

FIG. 2 — is an isometric view corresponding to FIG. 1 with one of the pipes removed and parts of the coupling broken away to reveal hidden details, and FIG. 3 — is an enlarged and broken section along the line III—III of FIG. 1.

In the embodiment illustrated in the accompanying drawings, piping in the form of pipes P-P are required to be joined together in flow-through relation; said pipes being optimally formed of a plastic which is inherently compatible with the materials destined to flow through it and is, in addition, rigid yet incisible for reasons which will duly appear, subject, of course, to the limitations expressed elsewhere herein.

Preferably the component substance of the pipes must not be given to "cold flow" or "creep" whereby it might withdraw from sharpened devices imbedded in it. In some of its forms, polyethylene is one example of a substance which is given to "cold flow" or "creep" as visualized by the invention and hence undesirable.

Conversely and in some of its forms polypropylene is a substance capable of being vested with appropriate rigidity, incisibility and resistance to creep rendering it preferable for piping as contemplated by the invention.

While the invention is not strictly confined thereto, as will be quite obvious to those in the art, the pipes P-P in the present embodiment of the invention are both visualized as two ordinary straight lengths whose raw ends 2-2 are interconnectable by the present coupling, as will appear to couple the said pipes P-P in flow-through relation.

Said ends 2-2 are fitted into the respective mating ends 4-4 of a sleeve 6 which are open and overlap the pipe ends 2-2 mated therewith; each pipe end 2 being overlapped by the specific sleeve end 4-4 with which it is mated substantially as will be obvious from FIGS. 2 and 3 of the drawing.

It will be understood that the word "mated" is herein used to indicate reasonably snug interfitting of the mating parts.

It is also desired to emphasize at this point that sleeve 6 is also formed of plastic having adequate rigidity to support the interconnected pipes P-P. On the other hand the substance of said sleeve 6 is deformable under compression to constrict about the pipe ends 2-2 mated therewith and to effect a tight frictional and sealing grip thereon as will duly appear.

In the present embodiment of the invention said sleeve ends 4-4 are substantially symmetrical about intermediate abutment means 8 constituted in this construction by an annular parapet on the interior wall 10 of the sleeve. As will be understood elevation of the abutment 8 above the sleeve wall 10 is not so great as to materially impede fluid-flow between the pipes P-P.

At all events, said sleeve ends 4-4, being similar to the indicated extent, the hereinafter following description of one will suffice for both.

On its interior surface, the wall 10 of each sleeve end 4 is provided with ribbing 12 which completely embraces the pipe end 2 installed therein, substantially as will be obvious from FIGS. 2 and 3 of the drawing and said ribbing 12 is integral with sleeve 6 and has the same deformable qualities so that when sleeve 6 is constricted about pipe end 2, as shown at the bottom of FIG. 3 the ribbing 12 will react to the crushing pressure by flattening against the pipe end 2 to mushroom and form individual seals preventing passage of fluids between pipe end 2 and sleeve 6. In the present instance the ribbing 12 is in the form of a separated series of discrete annular rings apparent from FIG. 2 which is individually — hence more easily conformingly flattened against pipe end 2 under constriction as aforesaid.

This is exemplified in FIG. 3 which is split to illustrate in its lower half the attitude and deformation of ribbing 12 under construction as aforesaid; the unconstricted attitude of ribbing 12 being shown in the upper half of the view.

It will be obvious that the constricting pressure which flattens ribbing 12 into seals also converts them into clutch rings exerting a tight frictional grip on the mating pipe end 2 as in the lower half of FIG. 3.

Each said sleeve end 4 is also fitted on its interior with pointed and sharpened means to be described which, being disposed and sandwiched between sleeve and pipe ends 4 and 2, will incise the latter and imbed itself therein when sleeve 6 is constricted as herein visualized. Anchoring means are thus formed which reinforces the tight frictional grip of the ribbing 12 on pipe end 2 to resist withdrawal of the pipe end from sleeve 6 under axial tension.

In the present embodiment of the invention said sharpened and pointed incising means is constituted by a "ring" knife 14 which is of channel cross-section having low flanges which are sharpened to form knife edges 16-16. Said ring knife 14 is preferably snugly seated in a rabbet or trench 18 formed in the interior wall 10 of sleeve 6 with its knife edges 16-16 protruding slightly from said trench 18. Said knife 14 is an incomplete annulus as shown in FIG. 2 to permit longitudinal movement thereof in trench 18.

Thus, when beading 12 is crushed and flattened under the constricting pressure aforesaid, the protruding knife edges 16-16 will be impressed simultaneously into the incisible pipe end 2 to anchor it to and within the sleeve 16 as in FIG. 3.

The constricting pressure hereinbefore frequently referred to is conveniently provided by a clamp C of a familiar type comprised of a fairly wide metal band 20 wrapped around sleeve 6 with offset flanges 22-22 at its ends which are joined together by screws 24-24 which are in their turn, adjustable to tighten clamp C releasably about sleeve 6; the resulting clamping pressure constricting the sleeve 6 about the pipe ends 2-2 mating therewith in this embodiment.

In width, the band 20 approximates the corresponding dimension of sleeve 6 although this is not critical. What is critical, however, is that the length of the band 20 between its flanges 22-22 be somewhat less than the peripheral dimension of sleeve 6 to enable the tightening of band 20 to the extent necessary to constrict sleeve 6 against the pipe ends 2-2 whereby to procure the crushing pressure required to flatten beading 12 against the pipe ends 2-2 and to imbed therein the knife edges 16-16 anchoring the pipe ends 2-2 in sleeve 6.

Preferably, means are provided on both the clamp band 20 and the sleeve 6 which co-operate with each other to maintain their parts in engagement whereby to prevent the clamp C from slipping off sleeve 6 under stress.

Said means provided on the sleeve 6 and clamp band 20 may comprise ridges 26 on each so disposed that when the clamp C is positioned about sleeve 6, said ridges 26 on one of them will intermesh with the ridges on the other to hold the parts in engagement with each other as generally shown at the right hand side of FIG. 2.

In summary, the invention broadly comprises the sleeve 6 divided by abutment 8 into two open ends 4-4 which mate respectively, with the ends 2-2 of pipes P-P.

In its interior, each said sleeve end 4 carries ribs 12-12 and an incisor — the knife 14— which is constrictable by clamp C about the pipe end 2 mated therewith to compress ribs 12-12 against said pipe end 22 and to imbed in it the knife edges 16-16.

In its relaxed or unconstricted state, said sleeve end 4 will accept insertion of pipe end 2 therein.

When compressed against pipe end 2, ribs 12-12 form seals which not only block escape of fluid between them but also exert a tight frictional grip on the pipe end, thus co-operating with knife 14 imbedded in the pipe end 2 to resist its withdrawal from sleeve end 4.

It is emphasized once again that the piping described has been selected for the exemplary puposes hereof purely as a convenience and not in a limiting sense; it being wholly immaterial to the invention whether or not the piping is short, long, straight, rounded, bent or otherwise so long as the raw ends thereof are receivable in a sleeve as herein visualized.

Moreover, it will be further obvious that the described coupling being symmetrical about the intermediate abutment 8, the inventive idea is embodied in the sleeve 6 on each side of the abutment 8. In consequence, it is quite within the concept of the invention that one of the pipes P may be formed of plastic as hereinbefore described to which the invention is applicable while the other pipe P to be coupled thereto is of a dissimilar material incompatible with the invention, in which event, various parts of the invention — for example, the sharpened anchor means — may be omitted from the corresponding half of the sleeve 6.

What I claim is:

1. In a coupling for interconnecting raw ends of rigid incisable piping in axially aligned, flow-through, relation, an annular sleeve having open ends respectively providing snug mating accommodation for the raw piping ends in said axially aligned, flow-through, relation;

annular abutment means intermediately disposed on the interior wall of the sleeve for limiting the penetration of said piping ends into said sleeve;

an annular trench in the interior wall of at least one of said sleeve ends, spaced from said aboutment means;

circumferentially discountinuous annular anchor means installable in said trench having spaced knife edges protruding from said trench;

integral annular ribbing on the interior wall of each said open sleeve end and completely embracing the respective piping ends, and a clamp, including a band wrapped around said sleeve operable to releasably clamp and radially constrict the sleeve generally throughout its full length about the raw piping ends accommodated therein;

said band having a width approximating the length of the sleeve and hence overlapping the anchoring means and the ribbing in each said sleeve end;

said sleeve being essentially rigid to maintain the axial alignment of the piping ends accommodated therein but being slightly compressible under the radially constricting pressure of the clamp to effect gripping and sealing engagement of the ribbing with the piping ends embraced and clamped thereby and to drive the protruding knife edges of the anchor means into incising engagement with the piping to prevent axial withdrawal thereof from the sleeve.

2. A coupling as defined in claim 1 wherein;
said sleeve includes an annular trench and anchor means as aforesaid in the interior walls of both said open ends.

3. A coupling as defined in claim 2 wherein each said anchor means is channel-shaped in cross-section.

4. A coupling as defined in claim 3 including;
means for positioning the said band on said sleeve, said means comprising ridges provided on said band and sleeve which are capable of mating with each other preventing said clamp from slipping off said sleeve under stress.

* * * * *